US 6,484,592 B2

(12) United States Patent
Sezaki

(10) Patent No.: US 6,484,592 B2
(45) Date of Patent: Nov. 26, 2002

(54) STEERING FORCE DETECTING MAGNETOSTRICTIVE TORQUE SENSOR

(75) Inventor: Nobuhiro Sezaki, Shizuoka (JP)

(73) Assignee: Suzuki Motor Corporation, Shizouka (JP)

( * ) Notice: Subject to any disclaimer, the term of this patent is extended or adjusted under 35 U.S.C. 154(b) by 0 days.

(21) Appl. No.: 09/826,848

(22) Filed: Apr. 6, 2001

(65) Prior Publication Data

US 2001/0029791 A1 Oct. 18, 2001

(30) Foreign Application Priority Data

Apr. 17, 2000 (JP) ........................................ 2000-114958

(51) Int. Cl.$^7$ ................................................ G01L 3/02
(52) U.S. Cl. ................................................ 73/862.335
(58) Field of Search ...................... 73/862.08, 862.331, 73/862.332, 862.333, 862.335, 862.193

(56) References Cited

U.S. PATENT DOCUMENTS

| 487,874 | A | * | 12/1892 | Elliott ........................ 152/513 |
| 4,876,899 | A | * | 10/1989 | Strott et al. ............. 73/862.331 |
| 4,885,944 | A | * | 12/1989 | Yagi et al. .............. 73/862.335 |
| 4,887,461 | A | * | 12/1989 | Sugimoto et al. .......... 73/118.1 |
| 4,986,137 | A | | 1/1991 | Sato et al. |
| 5,255,567 | A | * | 10/1993 | Miyake et al. ......... 73/862.333 |
| 5,526,704 | A | * | 6/1996 | Hoshina et al. ........ 73/862.333 |
| 5,589,645 | A | * | 12/1996 | Kobayashi et al. ......... 324/209 |

FOREIGN PATENT DOCUMENTS

DE 19702519 7/1997

OTHER PUBLICATIONS

English Language Abstract of DE 197 02 519.

* cited by examiner

Primary Examiner—Max Noori
(74) Attorney, Agent, or Firm—Greenblum & Bernstein, P.L.C.

(57) ABSTRACT

The present invention provides a steering force detecting magnetostrictive torque sensor including a magnetism detection unit 12 and a casing 15 made from a non-magnetic high conductive material. The magnetism detection unit 12 includes a coil bobbin 23 having excitation coils 22a and 22b and detection coils 20 and 21 and a yoke 24 formed into a unitary block. The magnetism detection unit 12 is attached into the casing 15. Through holes 26a and 26b are arranged in the casing 15, and a sensor shaft 8 is inserted into the through holes via bearings 27a and 27b. The casing 15 prevents magnetic leak and noise intrusion, so as to assure the torque detection accuracy by the magnetism detection unit 12 and eliminate the energy loss due to heat generation between the magnetism detection unit 12 and the casing 15. Moreover, unnecessary external force transmitted from the steering shaft connected to the sensor shaft 8 and the steering output shaft 3 is received by the casing 15 via the bearings 27a and 27b, thereby eliminating an affect to the magnetism detection unit 12 enabling to stabilize the torque detection accuracy.

9 Claims, 5 Drawing Sheets

Prior Art

STEERING FORCE DETECTING MAGNETOSTRICTIVE TORQUE SENSOR

BACKGROUND OF THE INVENTION

1. Field of the Invention

The present invention relates to improvement of a magnetostrictive torque sensor for detecting a steering force and in particular, to suppress a magnetic leak and improvement of a mechanical strength.

2. Description of the Related Art

A steering force detecting magnetostrictive torque sensor is already known for driving and controlling a power steering system by detecting a steering force functioning on a steering shaft so as to output a torque detection signal.

This type of magnetostrictive torque sensor includes: a magnetic-anisotropy at the surface of the sensor shaft that connecting a steering shaft; and an excitation coil and a detection coil arranged around the magnetic-anisotrophy, so that a torsion generated at the surface of the sensor shaft according to the steering torque by a driver is detected as a change of magnetic permeability of the magnetic anisotropy, thereby detecting a steering force functioning on the steering shaft.

Because a conventional steering force detecting magnetostrictive torque sensor is not provided with particular magnetic shield means, the magnetostrictive torque sensor attached to a vehicle is affected by a change of external magnetic environment. For this, at the stage before attaching the torque sensor, there is a problem that it is difficult to adjusting a zero-torque signal (an output when no external force is applied) of the sensor.

In order to solve this problem, there has been suggested a steering force detecting magnetostrictive torque sensor including a detection coil and an excitation coil having an outer circumference covered by a shield formed from a non-magnetic high-conductive material, thereby preventing a magnetic leak from the detection coil and the excitation coil as well as an external noise so as to obtain a magnetically stable environment around the sensor.

As shown in FIG. 5, in this steering force detecting magnetostrictive torque sensor, as shown in FIG. 5, has an outer circumference covered by a shield 102 formed from a non-magnetic high-conductive material, thereby suppressing a magnetic leak from the detection coil 101 and the outer circumference of the shield 102 is covered by a yoke 103 formed by a soft-magnetic material, thereby preventing an external noise.

However, since the shield 102 of a non-magnetic and high conductive material is arranged in close contact to the outer circumference of the detection coil 101, the energy loss due to heat dissipation is great, lowering the sensitivity of the magnetostrictive torque sensor.

Moreover, since the yoke 103 is mounted in an exposed stated, an external force may be applied to this portion, which changes a magnetic characteristic of the yoke 103. That is, a special attention should be paid in handling.

Furthermore, for mounting the detection coil 101 and shield 102, a coil bobbin 100 is formed with variable diameter values. The sensor shaft 105 is fixed as a unitary block to this coil bobbin via a bearing 104. Accordingly, when an excessive load is applied to this coil bobbin 100 by eccentricity of the steering shaft and the steering output shaft, the coil bobbin 100 itself may be deformed or scratched. Furthermore, relative positional changes are caused between the detection coil 101, the shield 102, the yoke 103, and the like, causing a fluctuation of the detection characteristic.

SUMMARY OF THE INVENTION

It is therefore an object of the present invention to provide a steering force detecting magnetostrictive torque sensor magnetically stable and having a sufficient mechanical strength and a reduced energy loss due to heat dissipation.

The present invention provides a steering force detecting magnetostrictive torque sensor comprising: a sensor shaft mounted between a steering shaft and a steering output shaft; a magnetic anisotropy at the surface of the sensor shaft; a coil bobbin wound by an excitation coil and a detection coil to surround the magnetic anisotropy; and a yoke surrounding the coil bobbin, the steering force detecting magnetostrictive torque sensor further comprising a casing including a casing main body formed from a non-magnetic high conductive material as a container having one side opening and an access panel to cover the opening, wherein the coil bobbin and the yoke constitute a magnetism detection unit, which is arranged inside the casing main body, and a through hole is arranged at two end portions in the axial direction of the magnetism detection unit in the casing main body for inserting the sensor shaft, so that the sensor shaft is rotatably attached to the through holes via a bearing.

The casing main body made from a non-magnetic high conductive material and having the magnetism detection unit function as a magnetic shield, so as to suppress magnetic leak from the detection coil and the excitation coil as well as prevent intrusion of an external noise. This eliminates an external magnetic environment change caused before and after mounting the magnetostrictive torque sensor to a vehicle.

Moreover, a sufficient space can be obtained around the excitation coil and the detection coil in the casing body covered by the access panel. Accordingly, it is possible to reduce the energy loss such as heat generation caused by interaction between the coils and the casing main body and the access panel made from a non-magnetic high conductive material, thereby preventing lowering sensitivity of the magnetostrictive torque sensor.

Moreover, the yoke arranged at the outermost portion of the magnetism detection unit is protected by the casing main body and the access panel. Accordingly, there is no possibility of application of an unnecessary external force to the yoke and it becomes easier to handle the entire apparatus.

Furthermore, the sensor shaft having the magnetic anisotropy is rotatably attached via bearings to through holes arranged on the two walls of the casing main body positioned at the both end portions of the magnetism detection unit in the axial direction. Accordingly, even when eccentricity is present between the steering shaft and the sensor shaft or between the steering output shaft and the sensor shaft, there is no danger of deforming or scratching the excitation coil or the coil bobbin having the detection coil and the yoke by an external force. Thus, it is possible to obtain a sufficient mechanical strength and to eliminate characteristic changes due to fluctuations of a positional relationship between the members.

The access panel covering the opening of the casing main body may be formed by a multi-layered circuit board on which an electric component is mounted for processing a signal from the detection coil.

This type of multi-layered circuit board includes a copper foil layer in the board itself and accordingly, can be used in place of the magnetic shield formed from a non-magnetic high conductive material. That is, there is no need to provide a dedicated access panel formed from a non-magnetic high conductive material and the circuit board serves also as the magnetic shield. This reduces the cost of the entire apparatus.

Moreover, it is also possible to insert a shield panel formed from a non-magnetic high conductive material between the access panel and the magnetism detection unit.

In this case, the cost is slightly increased as compared to a case using only the copper foil layer of the multi-layered circuit board itself as the magnetic shield. However, it becomes possible to assure a shield effect, thereby further improving magnetic stability of the magnetostrictive torque sensor.

Furthermore, the bearing supporting the sensor shaft may be an ordinary bearing or a bush made from a non-magnetic high conductive material.

By utilizing a bush made from a non-magnetic high conductive material instead of an ordinary bearing, it is possible to further reduce magnetic leak and noise, thereby improving the magnetic stability of the magnetostrictive torque sensor. As the non-magnetic high conductive material for the casing main body and the shield panel, it is preferable to employ an aluminum alloy or the like, considering the weight and machining feasibility. The bush serving as the bearing is preferably formed from a JIS PBC2 material, considering the abrasion resistance.

Moreover, a convex/concave engagement portion is formed on inner sides of two walls of the casing main body positioned at both end portions of the magnetism detection unit in the axial direction and at both end portions of the magnetism detection unit in the axial direction for positioning the magnetism detection unit with respect to the casing main body, and the both end portions of the magnetism detection unit in the axial direction are fixed by an adhesive to the two inner sides of the two walls.

Thus, with the configuration of accurately positioning the magnetism detection unit with respect to the casing main body, it is possible to properly maintain a positional relationship of the excitation coil and the detection coil against the sensor shaft mounted onto the casing main body via a bearing or a bush.

BRIEF DESCRIPTION OF THE DRAWINGS

FIG. 2(*b*) is a side view of the steering force detecting magnetostrictive torque sensor according to the embodiment.

FIG. 3(*b*) is a side view of the steering force detecting magnetostrictive torque sensor using a bush made from a non-magnetic high conductive material instead of an ordinary bearing

DESCRIPTION OF THE PREFERRED EMBODIMENTS

Figure 4:
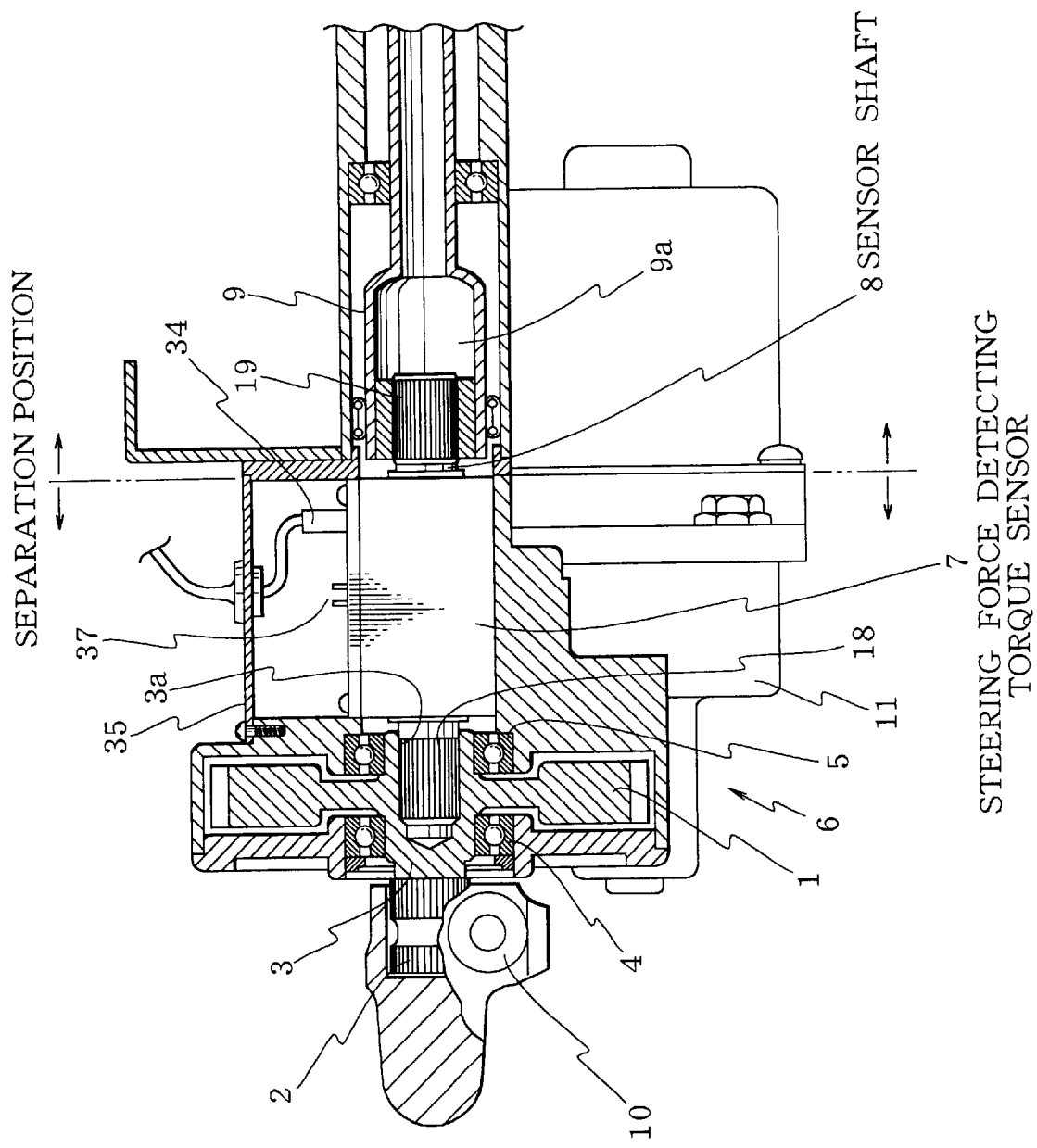
FIG. 4 is a cross sectional view showing a connection portion between the steering shaft and the steering unit in a power steering system for a vehicle.
Figure 5:
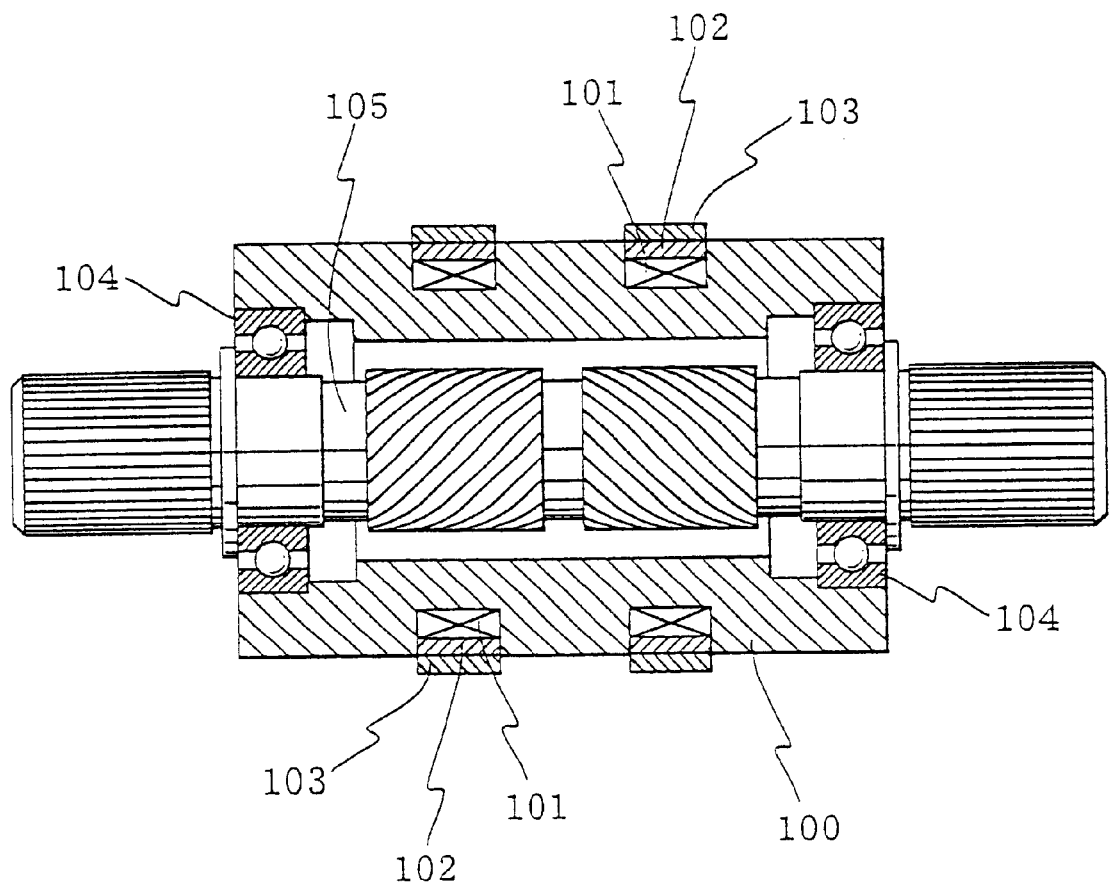
FIG. 5 is a cross sectional view a configuration of a conventional steering force magnetostrictive torque sensor.

Description will now be directed to embodiments of the present invention with reference to the attached drawings. FIG. 4 is a cross sectional view showing a simplified configuration of a connection portion between a steering shaft and a steering unit in a power steering system for a vehicle.

As shown in FIG. 4, a steering output shaft 3 including a spur gear 1 and a pinion 2 as a unitary block and rotatably attached into a steering wheel column via a plurality of bearings 4 and 5. Via a sensor shaft 8 spline-fitted to the steering output shaft 3 and a steering shaft 9 having one end spline-fitted to the sensor shaft, the steering output shaft 3 is rotated and driven by operation of a steering wheel (not depicted) arranged at the other end of the steering wheel.

Moreover, the pinion 2 arranged on the steering output shaft 3 is fitted into a rack of the steering unit (not depicted), so that the steering angle of a vehicle is adjusted by a known rack-and-pinion structure according to the rotation of the pinion 2.

In this steering process, a fine torsion is generated in the sensor shaft connecting the steering shaft 9 to the steering output shaft 3. The steering force detecting magnetostrictive torque sensor 7 magnetically detects this torsion and outputs it as a torque detection signal to a power steering controller (not depicted).

The power steering controller determines a steering direction and a steering force by a driver according to the torque detection signal value and drives an power-assist electric motor 11, so that the pinion 2 of the steering output shaft 3 is rotated via a spur gear 1 by a pinion (not depicted) fixed to the electric shaft of the electric motor 11, so as to power-assist the steering operation by a driver.

The aforementioned is the outline of the configuration of the vehicle power steering system utilizing the steering force detecting magnetostrictive torque sensor 7. Mechanical configurations of the steering unit not directly relevant to the present invention and electric configuration of the power steering controller are already known and their explanations are omitted.

Figure 1:
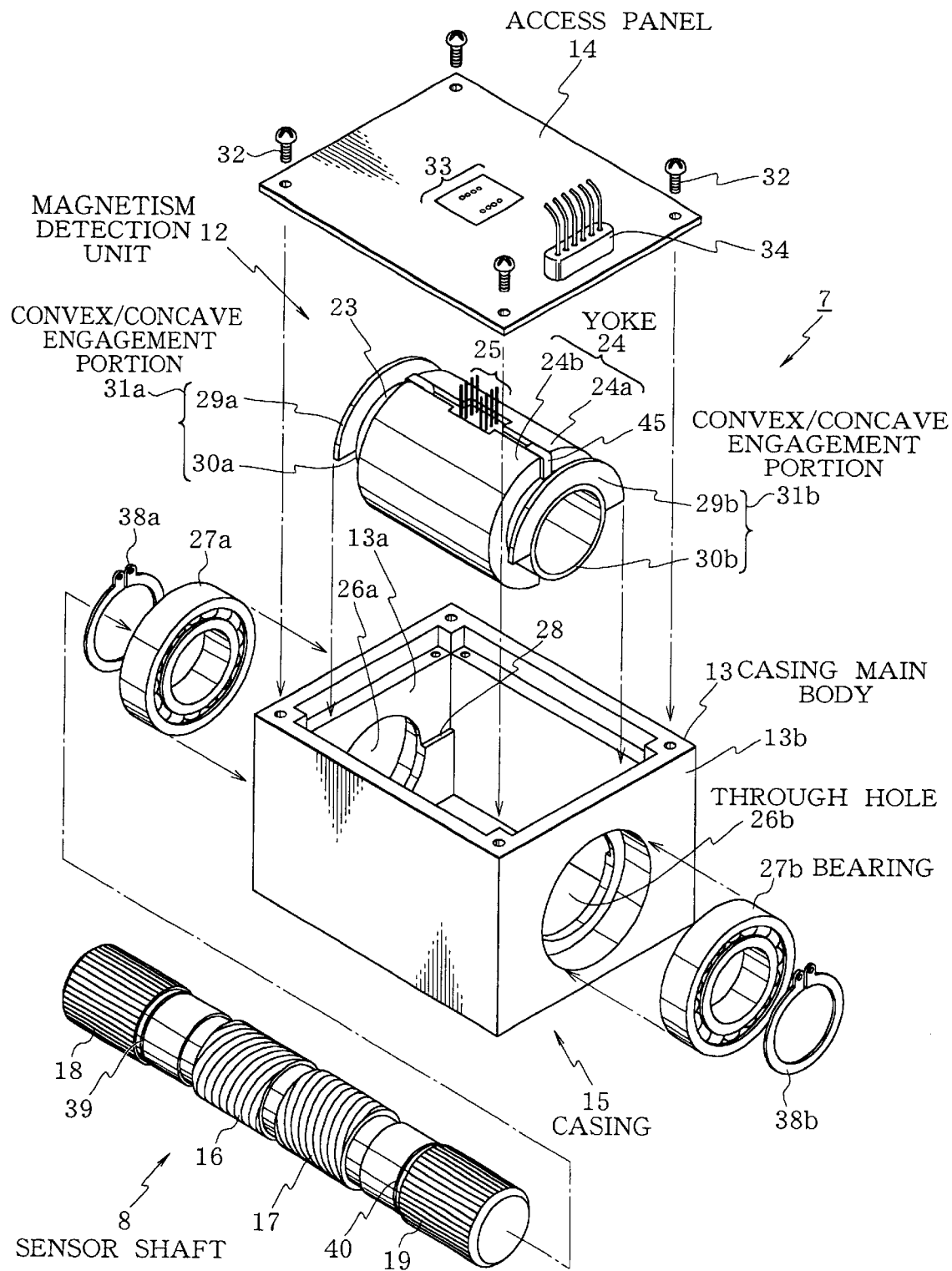
FIG. 1 is a perspective view showing a configuration of a steering force detecting magnetostrictive torque sensor according to an embodiment of the present invention.

Next, the steering force detecting magnetostrictive torque sensor 7 of the present embodiment will be detailed. FIG. 1 is a perspective view showing a configuration of the steering force detecting magnetostrictive torque sensor 7.

The steering force detecting magnetostrictive torque sensor 7 basically consists of a sensor shaft 8, a magnetism detection unit 12, a casing body 13 forming a casing 15, and an access panel 14.

The sensor shaft 8 connecting the steering shaft 9 to the steering output 3 has a configuration identical to the conventional one (see FIG. 4). That is, at the center portion of the sensor shaft 8 in the axial direction, a pair of magnetic anisotropys 16 and 17 is, fixed with an angle of 45 degrees against the shaft center. Moreover, a spline groove 18 for connecting to the steering output shaft 3 and a spline groove 19 for connecting the steering shaft 9 are arranged at the both end portions of the sensor shaft 8.

It should be noted that circumferential grooves 39 and 40 serve to mount a C-shaped ring for preventing a position shift. In this portion, C-shaped rings 38*a* and 38*b* (shown in FIG. 1) are mounted at the last stage of assembling the steering force detecting magnetostrictive torque sensor 7.

The magnetism detection unit 12, as shown in FIG. 2 (a), basically consists of detection coils 20 and 21 for the magnetic anisotropys 16 and 17, excitation coils 22a and 22b corresponding to the detection coils 20 and 21, a coil bobbin 23 wound by these coils 20, 21, 22a, and 22b, and a yoke 24 arranged to surround the coil bobbin 23.

The yoke 24 consists of two yoke members 24a and 24b (see FIG. 1) having an arc cross section for assembling. These two yoke members 24a and 24b are fixed from both ends of the coil bobbin 23 wound by the detection coils 20 and 21, and excitation coils 22a and 22b, thereby constituting a unitary magnetism detection unit 12. It should be noted that the flange 45 functions as a spacer and is used as a positioning member when mounting the yoke members 24a and 24b.

Lead lines 25 from the detection coils 20 and 21 and excitation coils 22a and 22b are collected at the center portion of the coil bobbin 23 and, as shown in FIG. 1, protrude upward through a cut-off portion formed at the boundary between the yoke members 24a and 24b.

The casing, as shown in FIG. 1, consists of the casing main body 13 and the access panel 14.

The casing main body 13 is formed from a non-magnetic high conductive material such as an aluminum alloy of a parallelopiped shape having one open side. Inside it, the magnetism detection unit 12 is mounted in parallel to an access panel 14.

Through holes 26a and 26b are arranged are opened in the two sides positioned at both end portions of the magnetism detection unit 12 in the axial direction, i.e., in the sides 13a and 13b of the casing main body 13, so that outer rings of the bearings 27a and 27b rotatably supporting the sensor shaft 8.

Figure 2A:
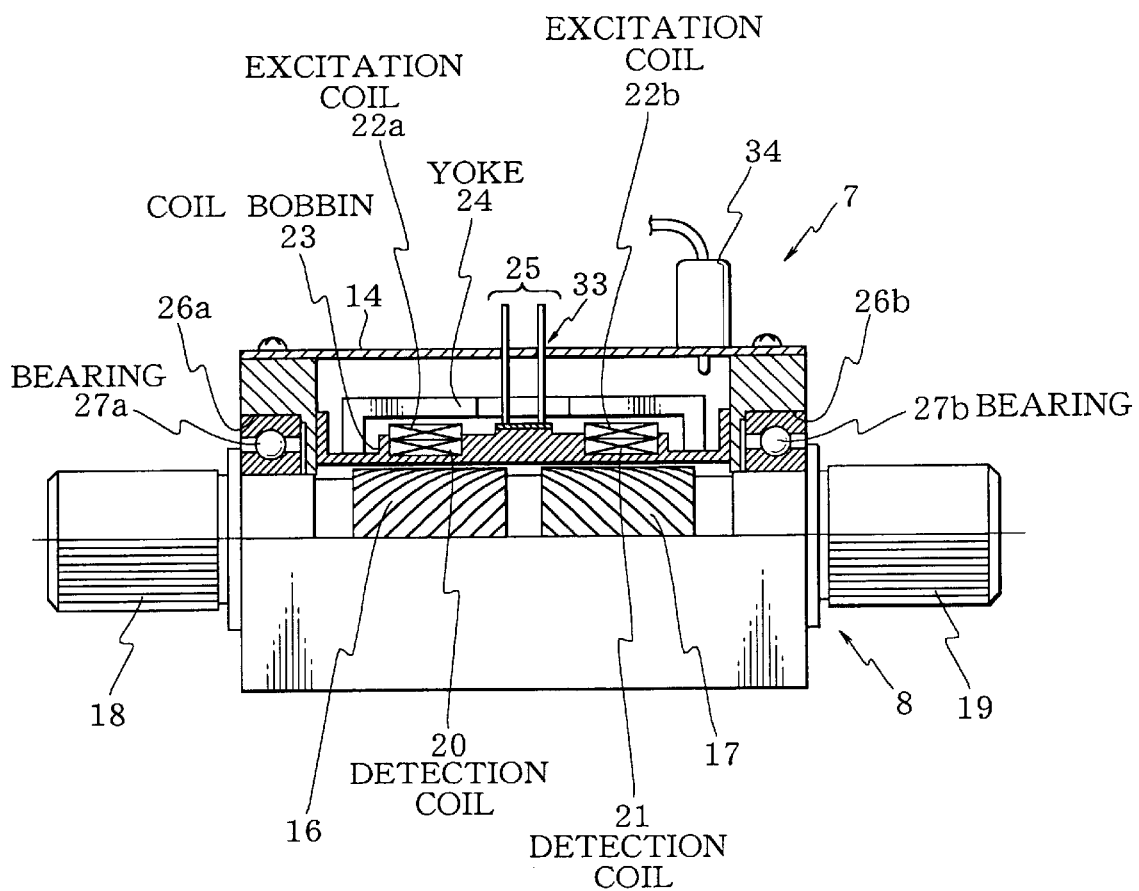
FIG. 2(*a*) is a partial cross-sectional view of an internal configuration of the steering force detecting magnetostrictive torque sensor according to the embodiment.

As shown in FIG. 2(a), each of these through holes 26a and 26b is a stepped hole having a greater diameter portion outside and a smaller diameter portion inside. The outer rings of the bearings 27a and 27b inserted through the greater diameter portion are supported by a stepped portion between the greater diameter portion and the smaller diameter portion.

Because the casing main body 13 has a simple configuration, it can easily be produced by dies cutting on casting or the like. Only those portions requiring a certain accuracy at the last stage such as the portions of the through holes 26a and 26b need be subjected to mechanical finishing. Of course, it is also possible to produce the casing main body 13 by a cutting process using a numerical control milling machine.

As shown in FIG. 1, on the surface 13a of the casing main body 13, a convex/concave engagement portion 28 is formed by a step for positioning the magnetism detection unit 12. Moreover, inside the surface 13b also, a convex/concave engagement portion 28 (not depicted) having an identical configuration is provided.

Corresponding to this, at both sides of the magnetism detection unit 12, i.e., at the both end portions of the coil bobbin 23, flange portions 29a and 29b and cut-off portions 30a and 30b are provided for assuring a contact surface for attaching the coil bobbin 23 to the surfaces 13a and 13b of the casing main body 13. These flange portions 29a and the cut-off portion 30a, and the flange portion 29b and the cut-off portion 30b constitute the convex/concave engagement portions 31a and 31b at the both ends of the magnetism detection unit 12.

When mounting the magnetism detection unit 12 in the casing main body 13, the magnetism detection unit 12 is inserted through the open hole at the top of the casing main body 13 and the convex/concave engagement portion 31a of the magnetism detection unit 12 is engaged with the convex/concave engagement portion 28 of the surface 13a of the casing main body 13. Simultaneously with this, the convex/concave engagement portion 31b of the magnetism detection unit 12 is engaged with the convex/concave portion of the surface 13b of the casing main body 13 and the flange portion 29a of the magnetism detection unit 12 is attached to the surface 13a of the casing main body 13 while the flange portion 29 of the magnetism detection unit 12 is attached to the surface 13b of the casing main body 13.

Moreover, the access panel 14 of the present embodiment is realized as a multi-layered circuit substrate on which electric components are mounted for processing signals from the detection coils 20 and 21. The multi-layered circuit substrate has a copper foil in the substrate itself and accordingly, can be used instead of a shield made from a non-magnetic high conductive material. By covering the open hole of the casing main body 13 with this multi-layered circuit substrate (access panel 14), it is possible to effectively prevent a magnetic leak from the detection coils 20 and 21 and excitation coils 22a and 22b as well as intrusion of an external noise.

It should be noted that here, the electric components may be, for example, a rectifier for rectifying signals from the detection coils 20 and 21, a comparator for determining a signal deviation, and a smoothing circuit such as a low-pass filter and may include a gain adjusting circuit and a zero-torque signal adjusting circuit.

The access panel 14 is screwed to the casing main body 13 with set screws 32 inserted into four screw holes arranged at the four corners of-the access panel 14.

Here, the lead lines 25 from the detection coils 20 and 21 and the excitation coils 22a and 22b are engaged in a connector portion 33 arranged on the access panel 14 formed from a multi-layered circuit board so as to obtain an electric connection between the detection coils 20 and 21 and the excitation coils 22a and 22b with the multi-layered circuit board.

Figure 2B:
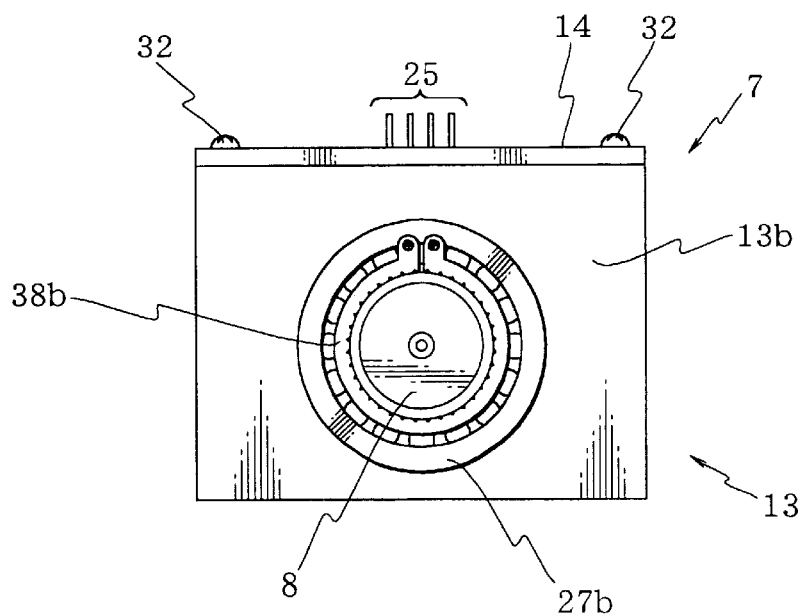

The sensor shaft is inserted into the coil bobbin 23, and the C-shaped rings 38a and 38b are inserted from the both ends of the sensor shaft 8. A C-shaped rings 38a is inserted into a circumferential groove 39 of the sensor shaft 8. Moreover, a C-shaped ring 38b is inserted into the circumferential groove 40 of the sensor shaft 8. The sensor shaft 8 is fixed in the axial direction of the sensor shaft 8 with respect to the inner ring of the bearings 27a and 27b, so as to prevent shift of the sensor shaft 8 in its axial direction with respect to the casing main body 13. FIG. 2(b) shows the steering force detecting output magnetostrictive torque sensor 7 after assembled.

When mounting the steering force detecting magnetostrictive torque sensor 7 thus assembled, to a steering wheel, firstly, as shown in FIG. 4, a hatch 35 of the steering wheel column 6 and the steering shaft 9 are removed and the steering force detecting magnetostrictive torque sensor 7 is inserted through a right open hole of the casing attachment space 37, so that the spline groove 18 of the sensor shaft 8 is engaged with the socket portion 3a of the steering output shaft 3. It should be noted that in FIG. 4, the separation position of the steering column 6 when removing the steering shaft 9 is indicated by a two-dot chain line.

The socket portion 9a of the steering shaft 9 is engaged with the spline groove 19 of the sensor shaft 8. The separation position of the steering column 6 indicated by the two-dot chain line in FIG. 4 is fixed with a screw.

Next, a connector-attached cable 34 from the steering force detecting magnetostrictive torque sensor 7 is inserted into the hole of the hatch 35 and fixed to the hatch 35 with a rubber bush. Via this connector-attached cable 34, the multi-layered circuit board of the steering force detecting magnetostrictive torque sensor 7 is electrically connected to the power steering controller (not depicted).

As has been described above, in this embodiment, the magnetism detecting unit 12 having the detection coils 20 and 21 and the excitation coils 22a and 22b is magnetically shielded by the casing 15 including the casing main body 13 formed from an aluminum alloy or the like and the access panel 14 formed from a multi-layered circuit board having a magnetic shield effect. This suppresses a magnetic leak from the detection coils 20 and 21 and the excitation coils 22a and 22b as well as prevent intrusion of an external noise.

This eliminates affect of an external magnetic environment change caused before and after mounting the steering force detecting magnetostrictive torque sensor 7 onto a vehicle, thereby assuring the magnetic stability of the steering force detecting magnetostrictive torque sensor 7.

Moreover, since fluctuation of magnetic characteristic generated before and after the mounting is eliminated, without actually mounting the steering force detecting magnetostrictive torque sensor 7 and the power steering controller (not depicted) on a vehicle for connection, it is possible to adjust the steering force detecting magnetostrictive torque sensor as a single body so as to properly adjust the zero-torque potential of the torque detection signal. By mounting the steering force detecting magnetostrictive torque sensor 7 thus adjusted on a vehicle, it is possible to obtain a sufficient torque detection accuracy.

Simultaneously with this, electric components such as the detection coils 20 and 21, the excitation coils 22a and 22b, and the yoke 24 are cut off from the external environment, thereby improving durability against a temperature change and humidity.

Moreover, the cylindrical magnetism detection unit 12 including the coil bobbin 23 and the yoke 24 is placed in the casing 15 of a parallelopiped shape. Accordingly, a sufficient space is formed around the excitation coils 22a, 22b and the detection coils 20, 21 in the casing 15 formed from a non-magnetic high conductive material. This eliminates an energy loss such as heat dissipation caused by an interaction between the coils 20, 21, 22a, 22b, and the casing 15 formed from a non-magnetic high conductive material, thereby preventing lowering of torque detection sensitivity.

Moreover, the yoke 24 arranged at the outermost portion of the magnetism detection unit 12 is mechanically protected by the casing 15. This prevents application of an unnecessary external force to the yoke 24 which easily causes a magnetic change when scratched or distorted.

Furthermore, the sensor shaft 8 is rotatably attached via the bearings 27a and 27b into the through holes 26a and 26b arranged in the two opposing surfaces of the casing main body 13. Accordingly, there is no danger that an external force is directly applied to the excitation coils 22a and 22b or to the coil bobbin 23 to which the detection coils 20 and 21 and the yoke 24 are attached. This increases the actual mechanical strength of the coil bobbin 23. This eliminates fluctuations of a relative position between the members caused by distortion of the coil bobbin 23 such as positional shifts of the excitation coils 22a and 22b and the detection coils 20 and 21 with respect to the magnetic anisotropys 16 and 17, thereby enabling to maintain the initial accuracy of the steering force detecting magnetostrictive torque sensor 7 for a long period of time.

Moreover, with the engagement between the convex/concave engagement portions 31a and 31b of the magnetic detection unit 12 and the convex/concave engagement portions 28, 28 of the casing main body 13, it is possible to obtain an accurate positioning between the magnetism detection unit 12 having the detection coils 20 and 21 and the excitation coil 22, and the casing main body 13. This assures a relative positional relationship between the magnetic-anisotropic members 16, 17 at the surface of the sensor shaft 8 and the detection coils 20 and 21 and the excitation coils 22a and 22b arranged in the magnetism detection unit 12. Regardless of the sensor shaft 8 attached via the casing main body 13 as a separate member from the coil bobbin 23, it is possible to attain a highly-accurate torque sensor.

Next, explanation will be given on some modifications of the aforementioned embodiment.

Figure 3A:
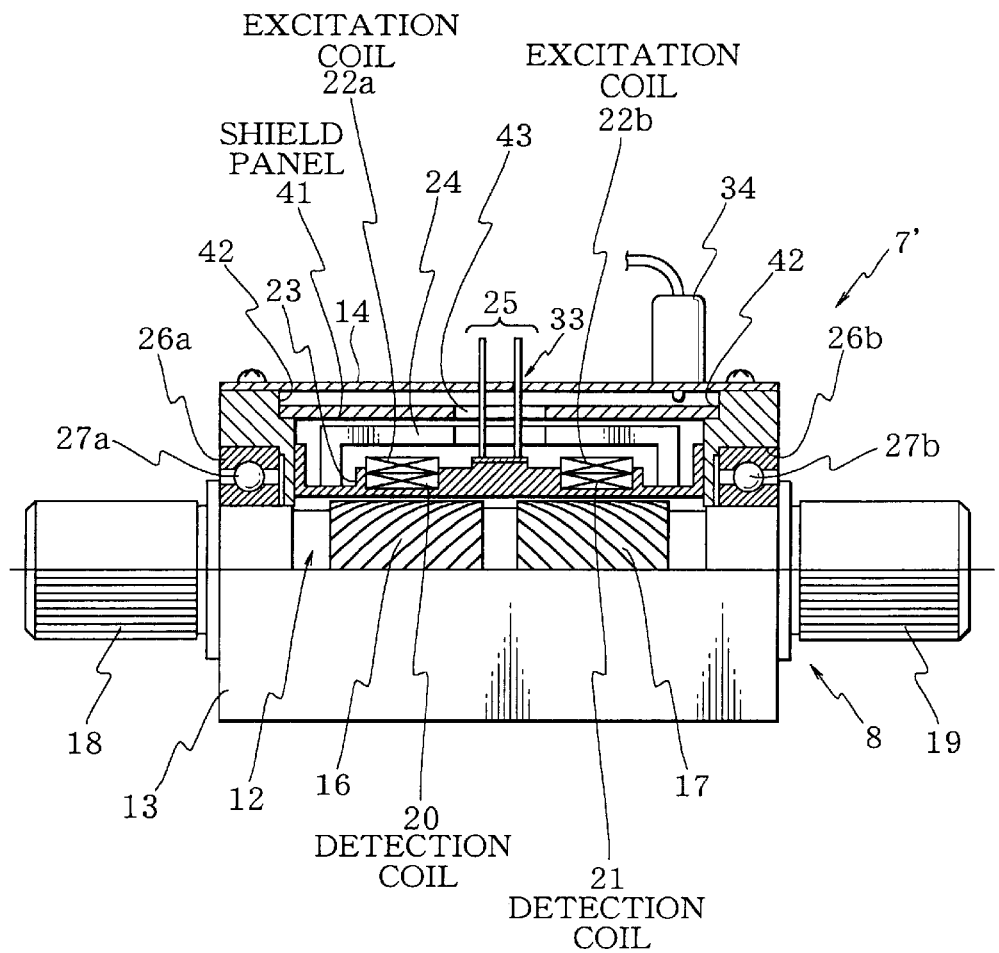
FIG. 3(*a*) is a partial cross-sectional view of the steering force detecting magnetostrictive torque sensor having a shield panel formed from a non-magnetic high conductive material inserted between the access panel and the magnetic detection unit.

Firstly, FIG. 3(a) is a cross sectional view of a steering force detecting magnetostrictive torque sensor 7' having a shield panel 41 formed from a non-magnetic high conductive material and inserted between the access panel 14 and the magnetism detection unit 12. The shield panel 41, for example, has a cut-off portion 42 as shown in FIG. 3(a) inside the upper end portions of the four side surfaces adjacent to the opening of the casing main body 13 and is attached to a stepped portion formed by the cut-off portion, utilizing a set screw. Moreover, to prevent contact of the lead lines 25 with the shield panel 41 to cause a short circuit, a large opening 43 of an appropriate size is provided at the center portion oft he shield panel 41. The other configurations are identical to the embodiment which has been explained with reference to FIG. 1 and FIG. 2.

For employing the aforementioned configuration, the production cost is slightly increased by addition of the shield panel 41 and increase in the number of machining steps. However, as compared to a case utilizing as a shield only a copper foil layer of the access panel 14 formed from a multi-layered circuit board, it is possible to significantly increase the magnetic shield effect, which further improves the efficiency of the magnetostrictive torque sensor.

On the contrary, it is also possible to attach the shield panel of non-magnetic high conductive material to the opening of the casing main body 13 and mount a multi-layered circuit board between the shield panel and the magnetism detection unit 12.

Figure 3B:
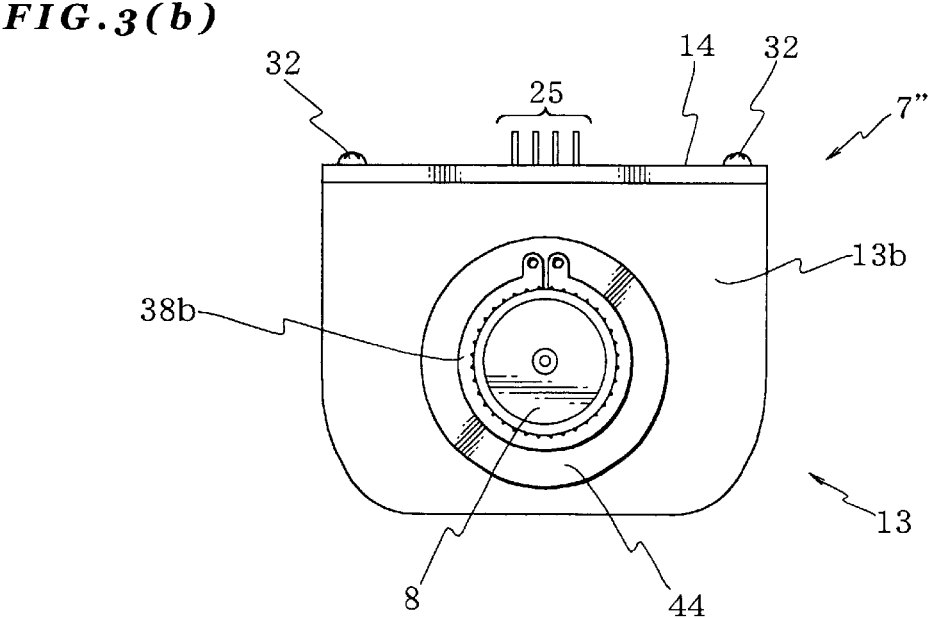

Moreover, FIG. 3(b) shows a modified example for rotatably holding the sensor shaft 8 by utilizing bushes 44, 44 made from a non-magnetic high conductive material instead of the ordinary bearings 27a and 27b.

The bush 44 may be formed from a material such as JIS PBC2 (copper-based alloy). The magnetic leak and the noise intrusion are further reduced, which in turn further improve the magnetic stability of the magnetostrictive torque sensor.

Furthermore, as shown in FIG. 3(b), when the casing main body 13 has an arc-shaped chamfered bottom, the production step utilizing dies cutting such as casting is further simplified, thereby enabling to improve the yield and the production cost.

Moreover, this chamfered portion facilitates the work when inserting the casing main body 13 into the casing attachment space 37 of the steering wheel column 6 and the entire assembly work.

The steering force detecting magnetostrictive torque sensor according to the present invention includes a magnetism detection unit having a coil bobbin wound by an excitation coil and a detection coil, and a yoke formed into a unitary block which is placed in a casing made from a non-magnetic high conductive material. This suppresses magnetic leak from the detection coil and the excitation coil. Simultaneously with this, intrusion of an external noise is prevented.

As a result, it becomes possible to eliminate an adverse affect from an external magnetic environment change caused before and after mounting the magnetostrictive torque sensor on a vehicle, thereby assuring magnetic stability of the magnetostrictive torque sensor as well as enabling to adjust an output of the magnetostrictive torque sensor as a single body before mounting it on a vehicle.

Moreover, since there is a sufficient space around the excitation coil and the detection coil in the casing, it is possible to reduce the energy loss due to heat generation by the interference between the coil and the non-magnetic high conductive material. This prevents sensitivity lowering of the magnetostrictive torque sensor.

Moreover, the yoke arranged at the outermost portion of the magnetism detection unit is protected by the casing. Accordingly, there is no danger of application of an unnecessary external force to cause a magnetic change, thereby facilitating the handling of the entire apparatus.

Moreover, the sensor shaft having the magnetic anisotropy is attached to a through hole formed in the casing via a bearing such as an anti-friction bearing and a plain bearing. Accordingly, even when eccentricity is caused in the steering shaft and the steering output shaft, there is no possibility of direct application of an external force to the coil bobbin having the excitation coil, the detection coil, and the yoke, which may deform or scratch the coil bobbin. Thus, mechanical strength of the coil bobbin is assured, thereby eliminating the magnetic characteristic change due to relative positional fluctuations between members such as the excitation coil, the detection coil, and the yoke.

Furthermore, the casing main body is covered by the access panel formed by the multi-layered circuit board having electric components for processing a signal from the detection coil, thereby constituting a sealed type casing. As compared to a case when producing a separate access panel from a non-magnetic high conductive material for shielding the casing main body, it is possible to reduce the entire apparatus production cost as well as the weight of the apparatus.

Moreover, by utilizing a bush formed from a non-magnetic high conductive material instead of the bearing for supporting the sensor shaft, the magnetic leak and noise intrusion are reduced, thereby further improving the magneto-electric stability of the magnetostrictive torque sensor.

Furthermore, a convex/concave engagement portion is formed on both of the magnetic detection unit and the casing for accurately positioning the magnetism detection unit and an adhesive is applied for connection between the both end portions of the magnetism detection unit and the interior of the casing. Accordingly, it is possible to assure an appropriate relative positional relationship between the excitation coil and the detection coil arranged in the magnetism detection unit, and the sensor shaft attached to the casing via the bearing and the bush, thereby enabling to obtain a stable torque detection. That is, it is possible to improve the mechanical strength obtained by bearing the sensor shaft utilizing the casing without lowering the torque detection accuracy.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-114958 (Filed on Apr. $17^{th}$, 2000) including specification, claims, drawings and summary are incorporated herein by reference in its entirety.

What is claimed is:

1. A steering force detecting magnetostrictive torque sensor comprising: a sensor shaft mounted between a steering shaft and a steering output shaft; a magnetic anisotropy at a surface of the sensor shaft; a coil bobbin wound by an excitation coil and a detection coil to surround the magnetic anisotropy; and a yoke surrounding the coil bobbin, the steering force detecting magnetostrictive torque sensor further comprising a casing including a casing main body formed from a non-magnetic high conductive material as a container having one side opening and an access panel to cover the opening, wherein the coil bobbin and the yoke constitute a magnetism detection unit, which is arranged inside the casing main body while forming a sufficient space around the magnetism detection unit to effectively eliminate an energy loss, and a through hole arranged at two end portions in the axial direction of the magnetism detection unit in the casing main body for inserting the sensor shaft, so that the sensor shaft is rotatably attached to the through holes via a bearing.

2. The steering force detecting magnetostrictive torque sensor as claimed in claim 1, wherein the access panel is formed by a multi-layered circuit board having an electric component for processing a signal from the detection coil.

3. The steering force detecting magnetostrictive torque sensor as claimed in claim 2, wherein a shield panel formed from a non-magnetic high conductive material is inserted between the access panel and the magnetism detection unit.

4. The steering force detecting magnetostrictive torque sensor as claimed in claim 1, wherein the bearing is formed from a bush made from a non-magnetic high conductive material.

5. The steering force detecting magnetostrictive torque sensor as claimed in claim 2, wherein the bearing is formed from a bush made from a non-magnetic high conductive material.

6. The steering force detecting magnetostrictive torque sensor as claimed in claim 3, wherein the bearing is formed from a bush made from a non-magnetic high conductive material.

7. The steering force detecting magnetostrictive torque sensor as claimed in claim 1, wherein a convex/concave engagement portion is formed on inner sides of two walls of the casing main body positioned at both end portions of the magnetism detection unit in the axial direction and at both end portions of the magnetism detection unit in the axial direction for positioning the magnetism detection unit with respect to the casing main body, and the both end portions of the magnetism detection unit in the axial direction are fixed by an adhesive to the two inner sides of the two walls.

8. The steering force detecting magnetostrictive torque sensor as claimed in claim 2, wherein a convex/concave engagement portion is formed on inner sides of two walls of the casing main body positioned at both end portions of the magnetism detection unit in the axial direction and at both end portions of the magnetism detection unit in the axial direction for positioning the magnetism detection unit with respect to the casing main body, and the both end portions of the magnetism detection unit in the axial direction are fixed by an adhesive to the two inner sides of the two walls.

9. The steering force detecting magnetostrictive torque sensor as claimed in claim 3, wherein a convex/concave engagement portion is formed on inner sides of two walls of the casing main body positioned at both end portions of the magnetism detection unit in the axial direction and at both end portions of the magnetism detection unit in the axial direction for positioning the magnetism detection unit with respect to the casing main body, and the both end portions of the magnetism detection unit in the axial direction are fixed by an adhesive to the two inner sides of the two walls.

* * * * *

UNITED STATES PATENT AND TRADEMARK OFFICE
CERTIFICATE OF CORRECTION

PATENT NO.     : 6,484,592 B2
DATED          : November 26, 2002
INVENTOR(S)    : N. Sezaki It is certified that error appears in the above-identified patent and that said Letters Patent is hereby corrected as shown below:

<u>Title page,</u>
Item [73], Assignee, "Shizouha" should be -- Shizuoka --.

Signed and Sealed this

Twenty-third Day of September, 2003

JAMES E. ROGAN
*Director of the United States Patent and Trademark Office*